(12) United States Patent
Bolger et al.

(10) Patent No.: US 9,388,775 B2
(45) Date of Patent: Jul. 12, 2016

(54) SYSTEMS AND METHODS FOR REFUELING CANISTER SYSTEM

(71) Applicant: Ford Global Technologies, LLC, Dearborn, MI (US)

(72) Inventors: Bryan Michael Bolger, Canton, MI (US); Michael Paul Lindlbauer, Canton, MI (US); Mark W. Peters, Wolverine Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 292 days.

(21) Appl. No.: 14/260,900

(22) Filed: Apr. 24, 2014

(65) Prior Publication Data

US 2015/0308389 A1 Oct. 29, 2015

(51) Int. Cl.
*F02M 25/08* (2006.01)
*B60K 6/20* (2007.10)

(52) U.S. Cl.
CPC .............. *F02M 25/0836* (2013.01); *B60K 6/20* (2013.01); *Y10S 903/902* (2013.01)

(58) Field of Classification Search
CPC .............. F02D 41/003; F02D 41/0032; F02D 41/0037; F02D 41/004; F02D 41/0042; F02D 41/0045; F02D 2250/02; F02D 19/0621; F02D 2200/0406; F02M 25/08; F02M 25/0818; F02M 25/0836; F02M 25/0854; F02M 25/0872; F02M 25/089; F02M 33/02; F02M 2025/0863; F02M 55/007; B60K 15/035; B60K 15/03504; B60K 2015/03566
USPC .......................................... 123/516, 518–521
See application file for complete search history.

(56) References Cited

U.S. PATENT DOCUMENTS

| | | | |
|---|---|---|---|
| 4,683,861 A | 8/1987 | Breitkreuz et al. | |
| 4,699,638 A | 10/1987 | Harris | |
| 4,815,436 A * | 3/1989 | Sasaki .............. | B60K 15/03504 123/520 |
| 5,123,459 A * | 6/1992 | Toshihiro ......... | B60K 15/03504 123/520 |
| 5,359,978 A * | 11/1994 | Kidokoro ........... | F02M 25/0836 123/516 |
| 5,584,278 A | 12/1996 | Satoh et al. | |
| 5,676,116 A * | 10/1997 | Kim ..................... | B60K 15/035 123/518 |
| 8,082,905 B2 | 12/2011 | Mai et al. | |

(Continued)

FOREIGN PATENT DOCUMENTS

WO 9624792 A1 8/1996

OTHER PUBLICATIONS

Dudar, Aed M., "System and Methods for Refueling a Vehicle," U.S. Appl. No. 14/313,646, filed Jun. 24, 2014, 37 pages.

(Continued)

*Primary Examiner* — Stephen K Cronin
*Assistant Examiner* — Xiao Mo
(74) *Attorney, Agent, or Firm* — James Dottavio; Alleman Hall McCoy Russell & Tuttle LLP

(57) ABSTRACT

Methods and systems are described for depressurizing a fuel tank prior to refueling. In one example, before refueling the fuel tank having a pressure above a first predetermined pressure, the pressure may be released through a first valve to the first predetermined pressure and the first valve may be closed. Further, a second valve may be opened to further reduce the pressure to a second predetermined pressure, and if flow through the second valve is less than desired, then the first valve may be opened until the second predetermined pressure is reached.

20 Claims, 9 Drawing Sheets

(56) References Cited

U.S. PATENT DOCUMENTS

| | | |
|---|---|---|
| 8,434,461 B2 | 5/2013 | Kerns et al. |
| 8,560,167 B2 | 10/2013 | Jentz et al. |
| 2009/0191470 A1 | 7/2009 | Shirasaki |
| 2011/0240145 A1 | 10/2011 | Pifer |
| 2012/0152370 A1 | 6/2012 | Menke et al. |
| 2013/0112176 A1 | 5/2013 | Peters et al. |
| 2014/0026992 A1 | 1/2014 | Pearce et al. |

OTHER PUBLICATIONS

Pifher, Kevin L. et al., "Method and System for Fuel System Control," U.S. Appl. No. 13/559,455, filed Jul. 26, 2012, 31 pages.

Dudar, Aed M. et al., "Fuel Tank Depressurization Before Refueling a Plug-In Hybrid Vehicle," U.S. Appl. No. 13/906,187, filed May 30, 2013, 28 pages.

Pearce, Russell Randall et al., "Engine-Off Leak Detection Based on Pressure," U.S. Appl. No. 13/962,562, filed Aug. 8, 2013, 27 pages.

Peters, Mark W. et al., "Systems and Methods for a Two-Valve Non-Integrated Refueling Canister Only System," U.S. Appl. No. 14/024,416, filed Sep. 11, 2013, 32 pages.

Anonymous, "A Nircos System for Non-ORVR Compliant Vehicles," IPCOM No. 000236469, Published Apr. 29, 2014, 2 pages.

* cited by examiner

SYSTEMS AND METHODS FOR REFUELING CANISTER SYSTEM

TECHNICAL FIELD

The field of the invention is related to fuel tank refilling of motor vehicles, and hybrid vehicles in particular.

BACKGROUND AND SUMMARY

Vehicle fuel systems include evaporative emission control systems designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system allows the vapors to be purged into the engine intake manifold for use as fuel.

When the engine is not running, some pressure may be bled through the canister to atmosphere, but the amount of this bleeding is limited to prevent escape of fuel vapors from the tank or canister into the atmosphere. Accordingly, pressure may build in the fuel tank. This is particularly the case with hybrid vehicles where the internal combustion engine is not always running and there are fewer opportunities to purge vapors.

When a vehicle operator refuels the vehicle, the fuel cap may be locked until venting is allowed to sufficiently reduce tank pressure. The inventors herein have developed systems and methods to handle depressurization during refueling events. In one example, a method comprises: before refueling a fuel tank having a pressure above a first predetermined pressure, releasing the pressure through a first valve to the predetermined pressure and then closing the first valve and opening a second valve to further reduce the pressure to a second predetermined pressure; and if flow through the second valve is less than desired, then opening the first valve until the second predetermined pressure is reached. Preferably the fuel cap is unlocked when the second predetermined pressure, typically around atmospheric pressure, is reached. In this way, depressurization is always achieved in a timely manner.

In another example, the method comprises: before refueling a fuel tank having a pressure above a first predetermined pressure, and when flow through a first and a second valve coupled to the fuel tank is at least at a desired flow, releasing the pressure through a first valve to the first predetermined pressure and then closing the first valve and opening a second valve to further reduce the pressure to a second predetermined pressure; and if flow through the first valve is less than desired, then opening the second valve until the first predetermined pressure is reached. Further, the second valve may be pulsed to gradually release pressure. In this way, the second valve may be advantageously used to release fuel tank pressure if flow through the first valve is less than desired.

In still another example, the method comprises: before refueling a fuel tank having a pressure below a first predetermined pressure, releasing the pressure through a second valve to a second predetermined pressure; and if the second valve is restricted and the pressure does not reach the second predetermined pressure within an expected time, then opening a first valve until the second predetermined pressure is reached, the first valve normally being used when the pressure is above the first predetermined pressure to reduce the pressure to the first predetermined pressure. In this way, prior to a refueling event, the fuel tank may be depressurized even if one of the two valves is diagnosed as having less than desired flow.

Accordingly, various methods are provided for cases where tank pressure is above a predetermined pressure, below the predetermined pressure, and even at negative pressure.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
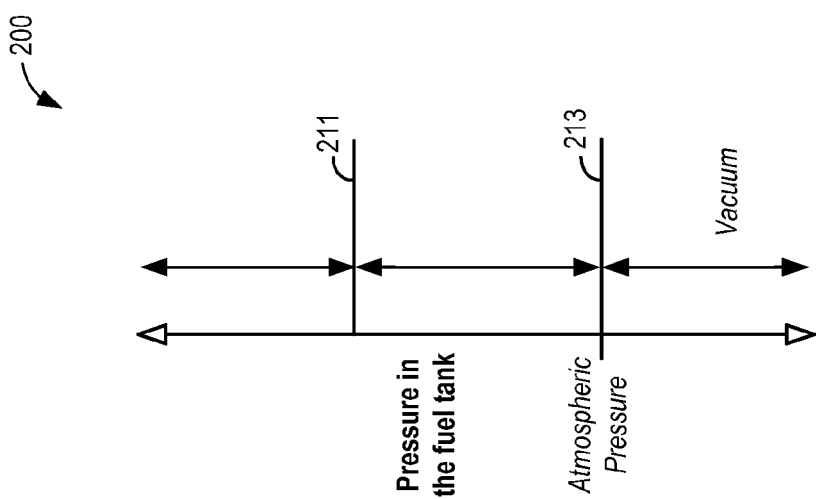
FIG. 2 portrays a range of pressures that may exist within a fuel tank.
Figure 1:
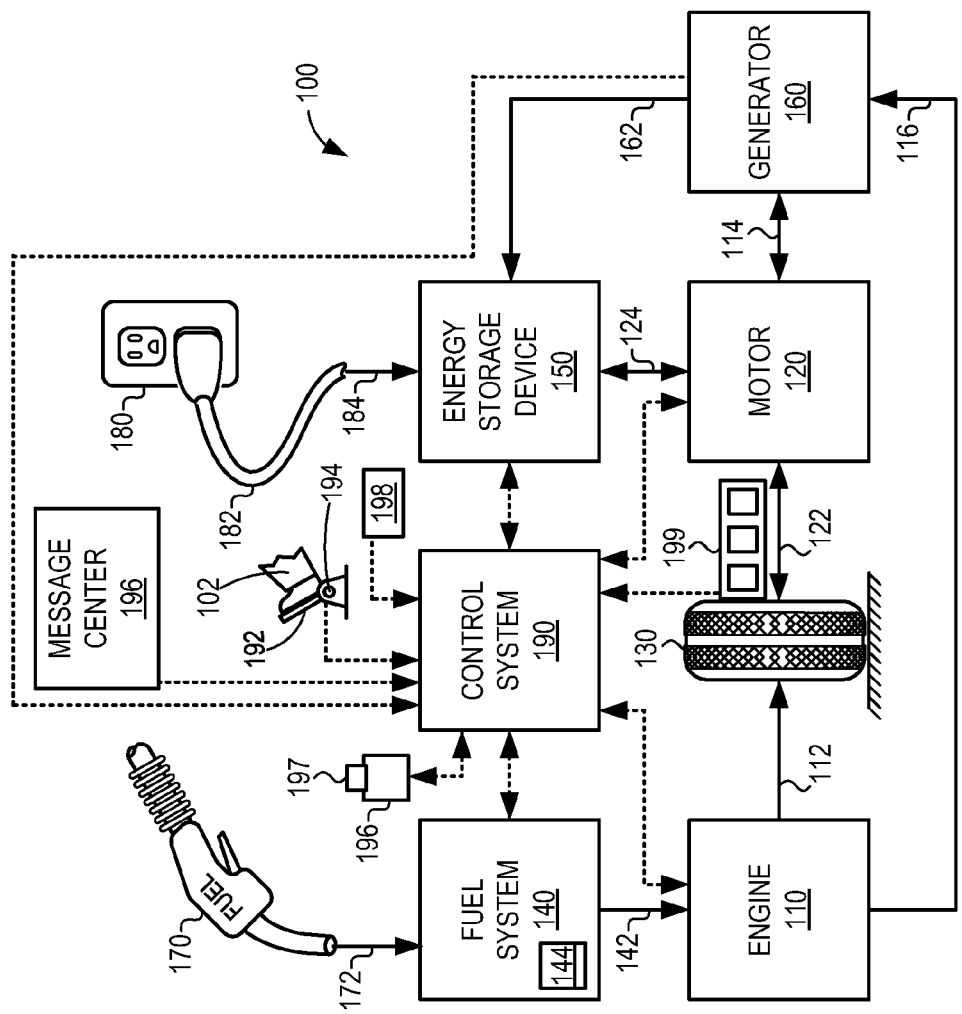
FIG. 1 illustrates an example vehicle propulsion system
Figure 3:
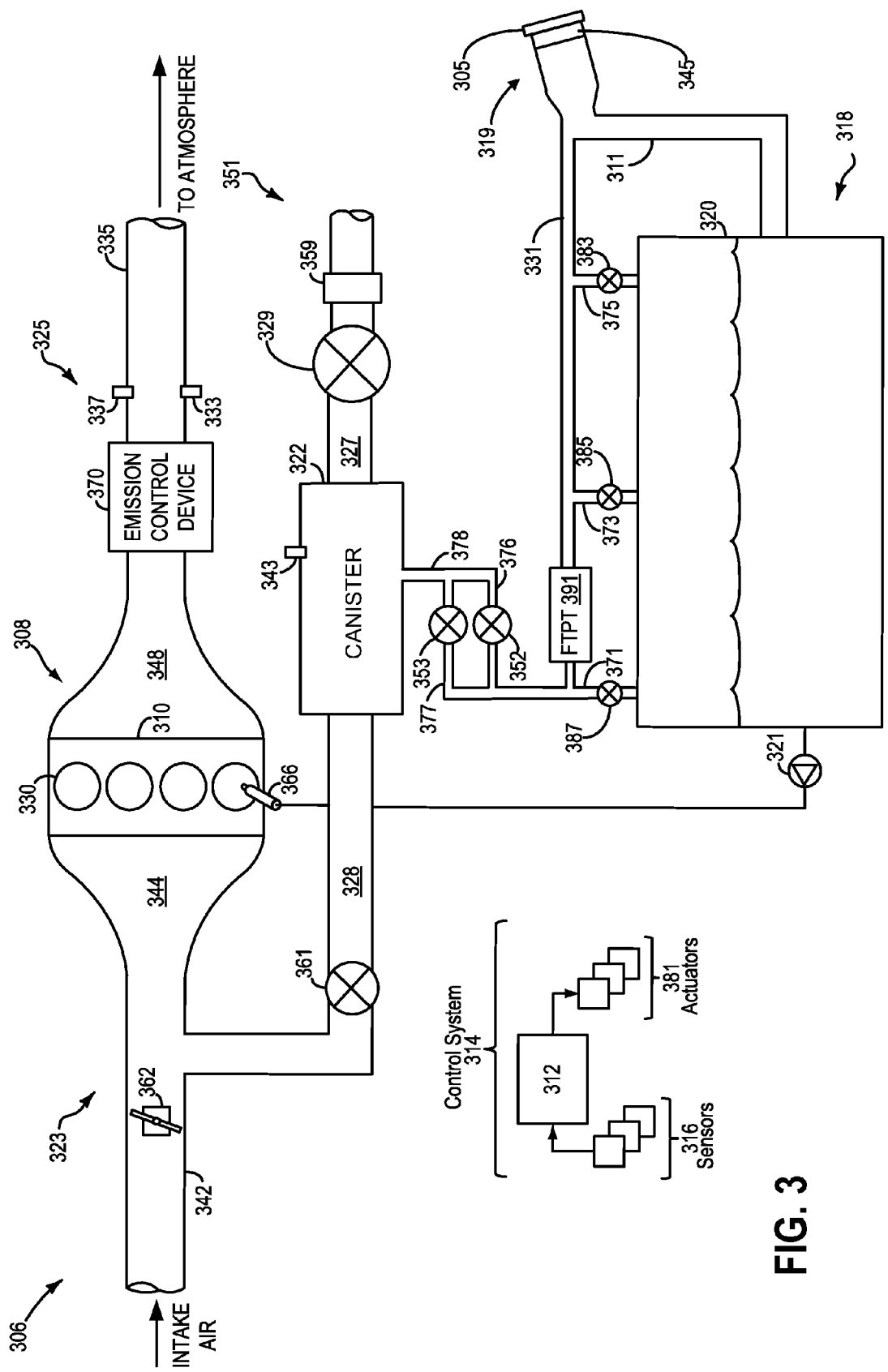
FIG. 3 shows an example vehicle system with a fuel system and an evaporative emissions system, according to the present disclosure.

The following description relates to systems and methods for depressurizing a fuel tank from either positive or negative pressures prior to a refueling event. The fuel tank may be included in a vehicle, such as a hybrid electric vehicle, as shown in FIG. 1. The vehicle may include a fuel system and an evaporative emissions system, as shown in FIG. 3. The fuel system may be coupled to the evaporative emissions system via a tank pressure valve and a refueling valve, the two valves in parallel, as shown by FIG. 3. Pressure within the fuel tank may be higher than a first predetermined threshold, between a first predetermined threshold and a second predetermined threshold (or atmospheric pressure), or lower than a second predetermined threshold (or atmospheric pressure) as shown in FIG. 2. A refueling request may be followed by various depressurization routines (FIG. 4) based on the existing pressure within the tank. The depressurization routines of FIGS. 5, 6, and 7 utilize one or both of the tank pressure valve and the refueling valve to release pressure within the tank. If flow through one of the valves is less than desired, the other valve may be opened to further release pressure to atmospheric.

Figure 8:
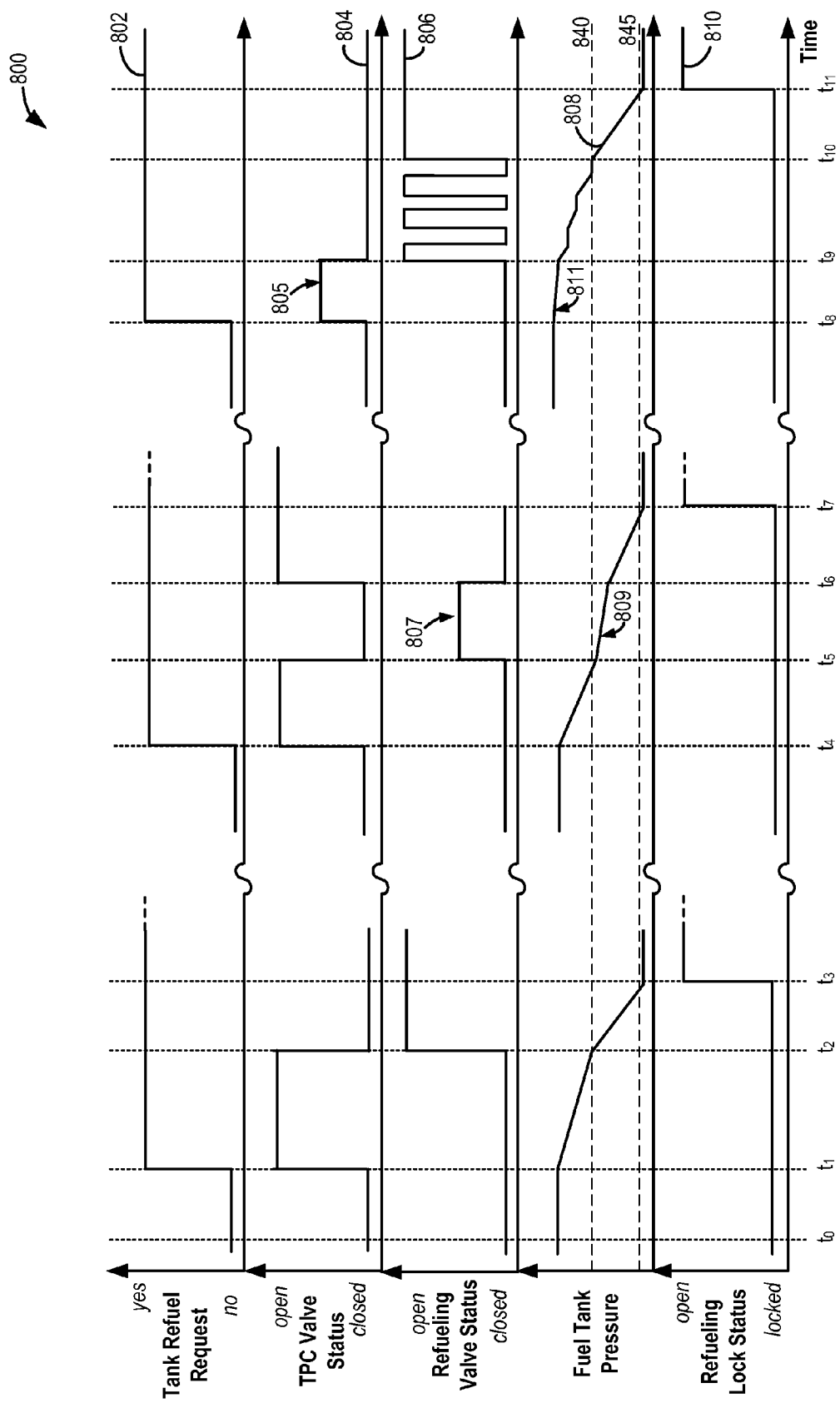
FIG. 8 is an example operation of depressurizing the fuel tank from a pressure higher than a first predetermined threshold.
Figure 9:
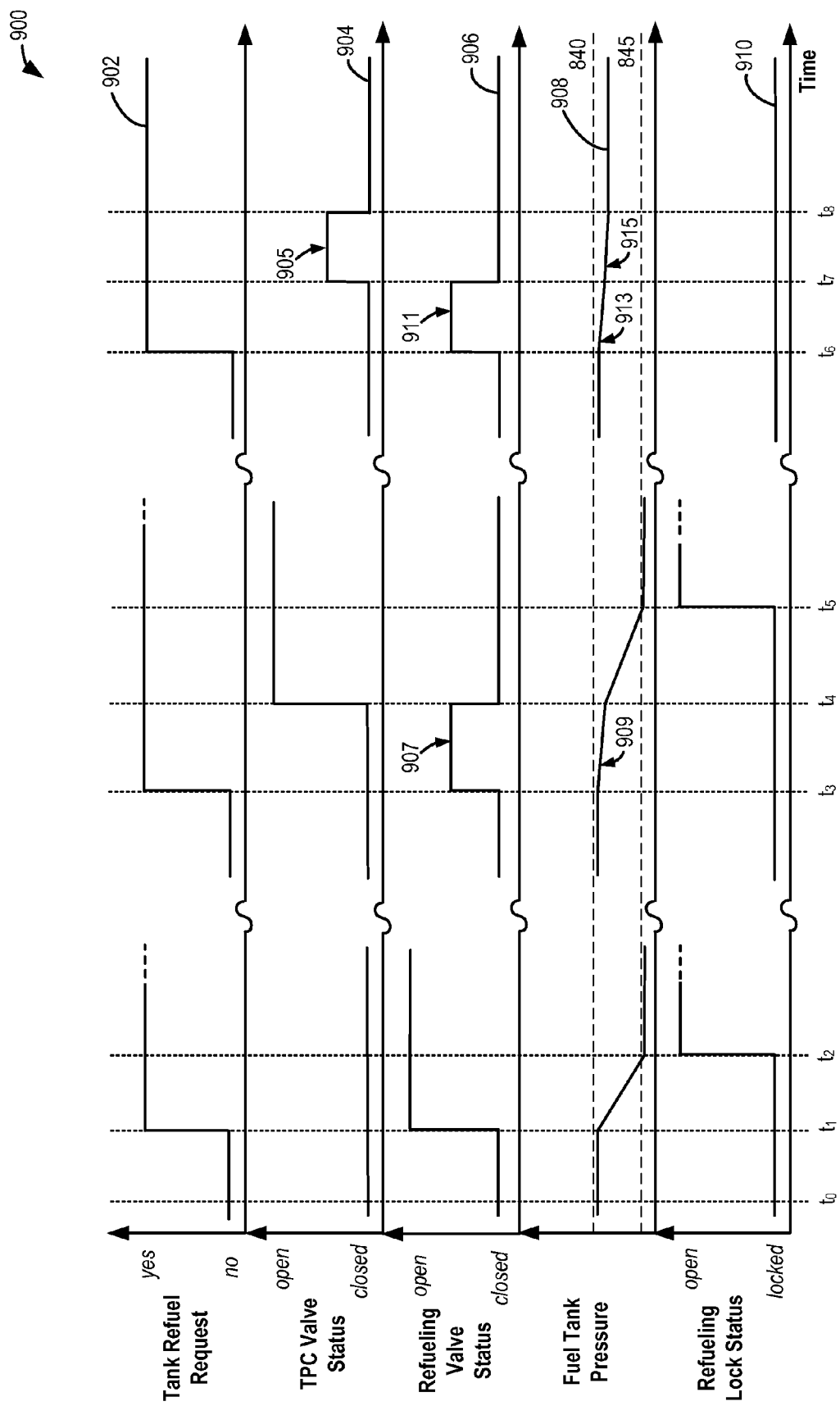
FIG. 9 is an example operation of depressurizing the fuel tank from a pressure lower than a first predetermined threshold.
Figure 10:
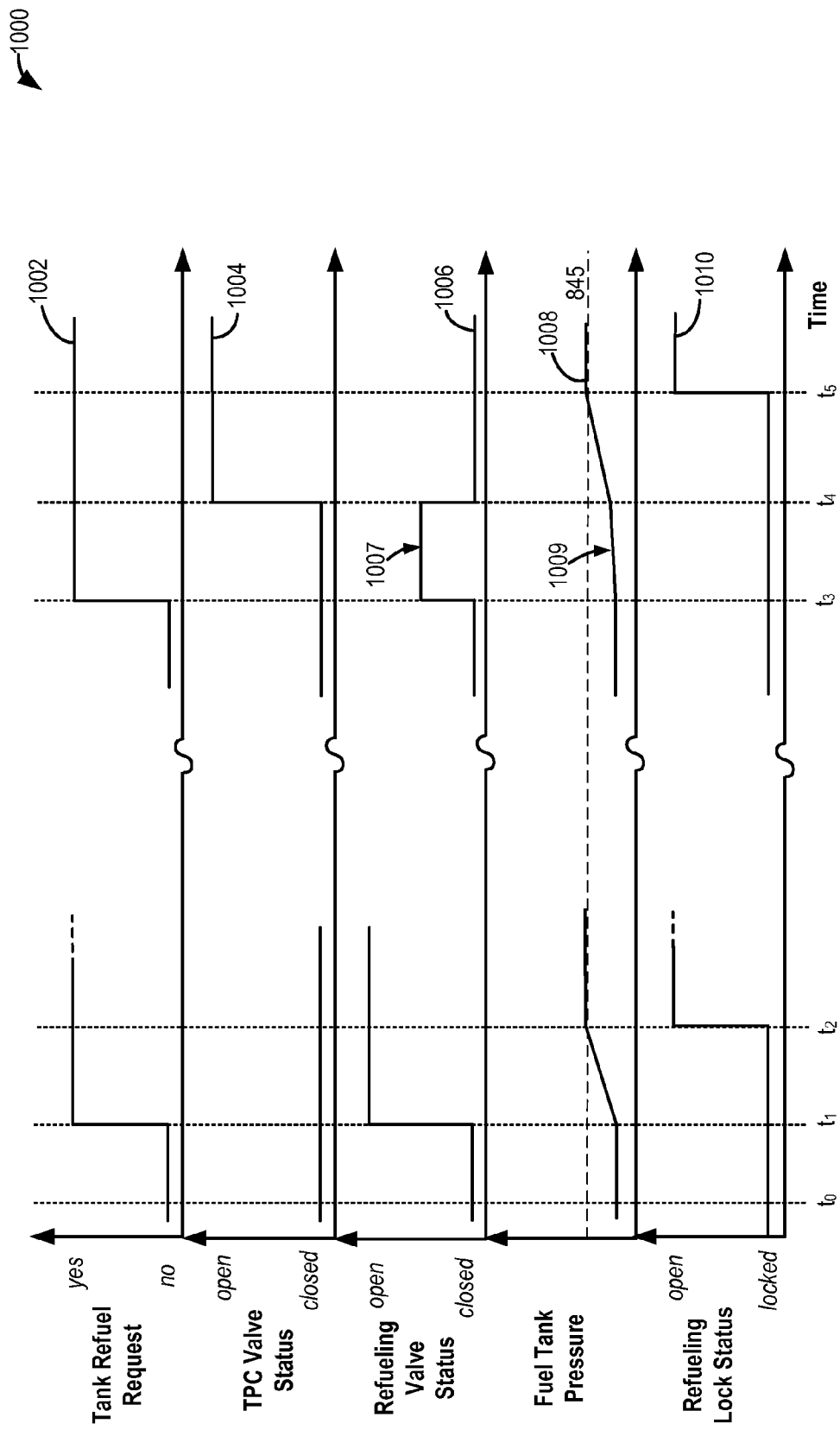
FIG. 10 is an example operation of depressurizing the fuel tank from a pressure lower than atmospheric pressure or a second predetermined threshold.

Various depressurization operations are depicted at FIGS. 8, 9, and 10 to portray the use of the tank pressure valve and the refueling valve.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Thus, liquid fuel may be supplied from fuel tank 144 to engine 110 of the motor vehicle shown in FIG. 1. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 4, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 3 shows a schematic depiction of a vehicle system 306. The vehicle system 306 includes an engine system 308 coupled to an emissions control system 351 and a fuel system 318. Emission control system 351 includes a fuel vapor container or canister 322 which may be used to capture and store fuel vapors. In some examples, vehicle system 306 may be a hybrid electric vehicle system.

The engine system 308 may include an engine 310 having a plurality of cylinders 330. The engine 310 includes an engine intake 323 and an engine exhaust 325. The engine intake 323 includes a throttle 362 fluidly coupled to the engine intake manifold 344 via an intake passage 342. The engine exhaust 325 includes an exhaust manifold 348 leading to an exhaust passage 335 that routes exhaust gas to the atmosphere. The engine exhaust 325 may include one or more emission control devices 370, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 318 may include a fuel tank 320 coupled to a fuel pump system 321. The fuel pump system 321 may include one or more pumps for pressurizing fuel delivered to the injectors of engine 310, such as the example fuel injector 366 shown. While only a single fuel injector 366 is shown, additional injectors are provided for each cylinder. It will be appreciated that fuel system 318 may be a return-less fuel system, a return fuel system, or various other types of fuel system.

Vapors generated in fuel system 318 may be routed to an evaporative emissions control system 351 which includes a fuel vapor canister 322 via vapor recovery line 331, before being purged to the engine intake 323. Vapor recovery line 331 may be coupled to fuel tank 320 via one or more conduits and may include one or more valves for isolating the fuel tank during certain conditions. For example, vapor recovery line 331 may be coupled to fuel tank 320 via one or more or a combination of conduits 371, 373, and 375.

Further, in some examples, one or more fuel tank vent valves in conduits 371, 373, or 375 may be included. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 371 may include a grade vent valve (GVV) 387, conduit 373 may include a fill limit venting valve (FLVV) 385, and conduit 375 may include a grade vent valve (GVV) 383. Further, in some examples, recovery line 331 may be coupled to a refueling system 319. In some examples, fuel filler system may include a fuel cap 305 for sealing off the fuel filler system from the atmosphere. Refueling system 319 is coupled to fuel tank 320 via a fuel filler pipe 311.

Further, refueling system 319 may include refueling lock 345. In some embodiments, refueling lock 345 may be a fuel cap locking mechanism. The fuel cap locking mechanism may be configured to automatically lock the fuel cap in a closed position so that the fuel cap cannot be opened. For example, the fuel cap 305 may remain locked via refueling lock 345 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold, e.g. to atmospheric pressure. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 345 may be a filler pipe valve located at a mouth of fuel filler pipe 311. In such embodiments, refueling lock 345 may not prevent the removal of fuel cap 305. Rather refueling lock 345 may prevent the insertion of a refueling pump into fuel filler pipe 311. The filler pipe valve may be electrically locked, for example by a solenoid, or mechanically locked, for example by a pressure diaphragm.

In some embodiments, refueling lock 345 may be refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 345 is locked using an electrical mechanism, refueling lock 345 may be unlocked by commands from controller 312, for example, when a fuel tank pressure decreases below a pressure threshold. In embodiments where refueling lock 345 is locked using a mechanical mechanism, refueling lock 345 may be unlocked via a pressure gradient, for example, when a fuel tank pressure decreases to atmospheric pressure.

Emissions control system 351 may include one or more emissions control devices, such as one or more fuel vapor canisters 322 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 351 may further include a canister ventilation path or vent line 327 which may route gases out of the fuel vapor canister 322 to the atmosphere when storing, or trapping, fuel vapors from fuel system 318.

Vent line 327 may also allow fresh air to be drawn into fuel vapor canister 322 when purging stored fuel vapors from fuel system 318 to engine intake 323 via purge line 328 and purge valve 361. For example, purge valve 361 may be normally closed but may be opened during certain conditions so that vacuum from engine intake manifold 344 is provided to the fuel vapor canister for purging. In some examples, vent line 327 may include an air filter 359 disposed therein upstream of a fuel vapor canister 322.

Flow of air and vapors between fuel vapor canister 322 and the atmosphere may be regulated by a canister vent valve 329. Canister vent valve 329 may be a normally open valve, so that tank pressure control valve 352 (TPC) and refueling valve 353 (RFV) may control venting of fuel tank 320 with the atmosphere. TPC 352 and RFV 353 may be normally closed valves, that when opened, allow for the venting of fuel vapors from fuel tank 320 to fuel vapor canister 322. Fuel vapors may then be vented to atmosphere via canister vent valve 329, or purged to engine intake 323 via canister purge valve 361. Thus, pressure within fuel tank 320 may be released to the atmosphere through TPC 352 and RFV 353 through at least one fuel vapor storage device, e.g. fuel vapor canister 322, as shown in FIG. 3. In another example, pressure from fuel tank 320 may be released to the air intake passage 342 of engine 310 through the fuel vapor storage device, e.g. fuel vapor canister 322.

Prior art examples typically utilize a single fuel tank isolation valve (FTIV) coupled between fuel tank 320 and fuel vapor canister 322 (or between fuel tank 320 and purge line 328 or vent line 327). In contrast, as depicted in FIG. 3, fuel system 318 and emission control system 351 are linked by TPC 352 and RFV 353. TPC 352 may be coupled between fuel tank 320 and fuel vapor canister 322 within conduit 376. RFV 353 may be coupled between fuel tank 320 and fuel vapor canister 322 within conduit 377. Conduits 376 and 377 may merge to form canister entry conduit 378. TPC 352 may have a smaller orifice and a smaller aperture than RFV 353. TPC 352 may be actuated during engine-on conditions to decrease the pressure in fuel tank 320 by venting fuel vapor to fuel vapor canister 322. During refueling events, TPC 352 may be utilized to decrease the pressure in fuel tank 320 to a first threshold. RFV 353 may be used to vent fuel vapor from fuel tank 320 into fuel vapor canister 322 during refueling operations. RFV 353 may be a normally closed valve that is opened in response to certain conditions. For example, RFV 353 may be actuated when the pressure in fuel tank 320 is below the first threshold. TPC 352 may have a smaller orifice diameter than the orifice diameter of RFV 353. Thus, pressure from fuel tank 320 may be released at a faster flow rate through RFV 353 than through TPC 352. TPC 352 may include an armature with a smaller diameter than an armature included in RFV 353. TPC 352 may include an armature with fewer coil turns than an armature included in RFV 353. Further, TPC 352 and RFV 353 may comprise solenoid actuated valves. Thus, opening and closing of these two valves may include pulse width modulating of the solenoids.

One or more pressure sensors 391 may be coupled to fuel system 318 for providing an estimate of a fuel system pressure. In one example, the fuel system pressure is a fuel tank pressure, wherein pressure sensor 391 is a fuel tank pressure sensor (or fuel tank pressure transducer FTPT) coupled to fuel tank 320 for estimating a fuel tank pressure or vacuum level. While the depicted example shows pressure sensor 391 coupled between fuel tank 320 and fuel vapor canister 322, in alternate embodiments, the pressure sensor may be directly coupled to fuel tank 320.

The vehicle system 306 may further include a control system 314. Control system 314 is shown receiving information from a plurality of sensors 316 (various examples of which are described herein) and sending control signals to a plurality of actuators 381 (various examples of which are described herein). As one example, sensors 316 may include exhaust gas sensor 337 located downstream of the emission control device 370, temperature sensor 333, fuel tank pressure sensor 391 and canister temperature sensor 343. Other sensors such as pressure, temperature, air/fuel ratio, and composition sensors may be coupled to various locations in the vehicle system 306. As another example, the actuators may include fuel injector 366, throttle 362, valves 387, 385, and 383, fuel pump system 321, and refueling lock 345. The control system 314 may include a controller 312. The controller may receive input data from the various sensors, process the input data, and trigger the actuators in response to the processed input data based on instruction or code programmed therein corresponding to one or more routines.

The system depicted in FIG. 3 and described herein may enable one or more methods. In one example, a method for a vehicle may comprise, before refueling a fuel tank having a pressure above a first predetermined pressure, releasing the pressure through a first valve to the predetermined pressure and then closing the first valve and opening a second valve to further reduce the pressure to a second predetermined pressure, and if flow through the second valve is less than desired, then opening the first valve until the second predetermined pressure is reached. In another example, a method may comprise, before refueling a fuel tank having a pressure above a first predetermined pressure, and when flow through a first and a second valve coupled to the fuel tank is at least at a desired flow, releasing the pressure through a first valve to the first predetermined pressure and then closing the first valve and opening a second valve to further reduce the pressure to a second predetermined pressure, and if flow through the first valve is less than desired, then opening the second valve until the first predetermined pressure is reached.

Controller 312 may be configured to perform the routines depicted in FIGS. 4, 5, 6, and 7 which relate to allowing pressure within the fuel tank to reach atmospheric pressure in preparation for a refueling event.

Pressure within the fuel tank may vary from higher than atmospheric to lower than atmospheric as shown in FIG. 2. Map 200 depicts pressure within the fuel tank on the vertical axis while line 211 depicts a first predetermined pressure threshold and line 213 indicates atmospheric pressure, also termed a second predetermined pressure threshold. The first predetermined pressure is a higher pressure than the second predetermined pressure. Thus, pressure within the fuel tank can be higher than the first predetermined threshold, line 211, or the pressure can be higher than atmospheric pressure (line 213) but lower than the first predetermined pressure threshold (line 211). Pressure within the fuel tank can also exist at a vacuum or negative pressure when pressure falls below the atmospheric pressure (line 213). For example, a vacuum may exist in the tank after fuel vapors have been drawn into the canister. In the following description, the first predetermined pressure is also referred to as a first threshold, $Threshold_1$. Further, the second predetermined pressure is also termed a second threshold, $Threshold_2$.

Figure 4:
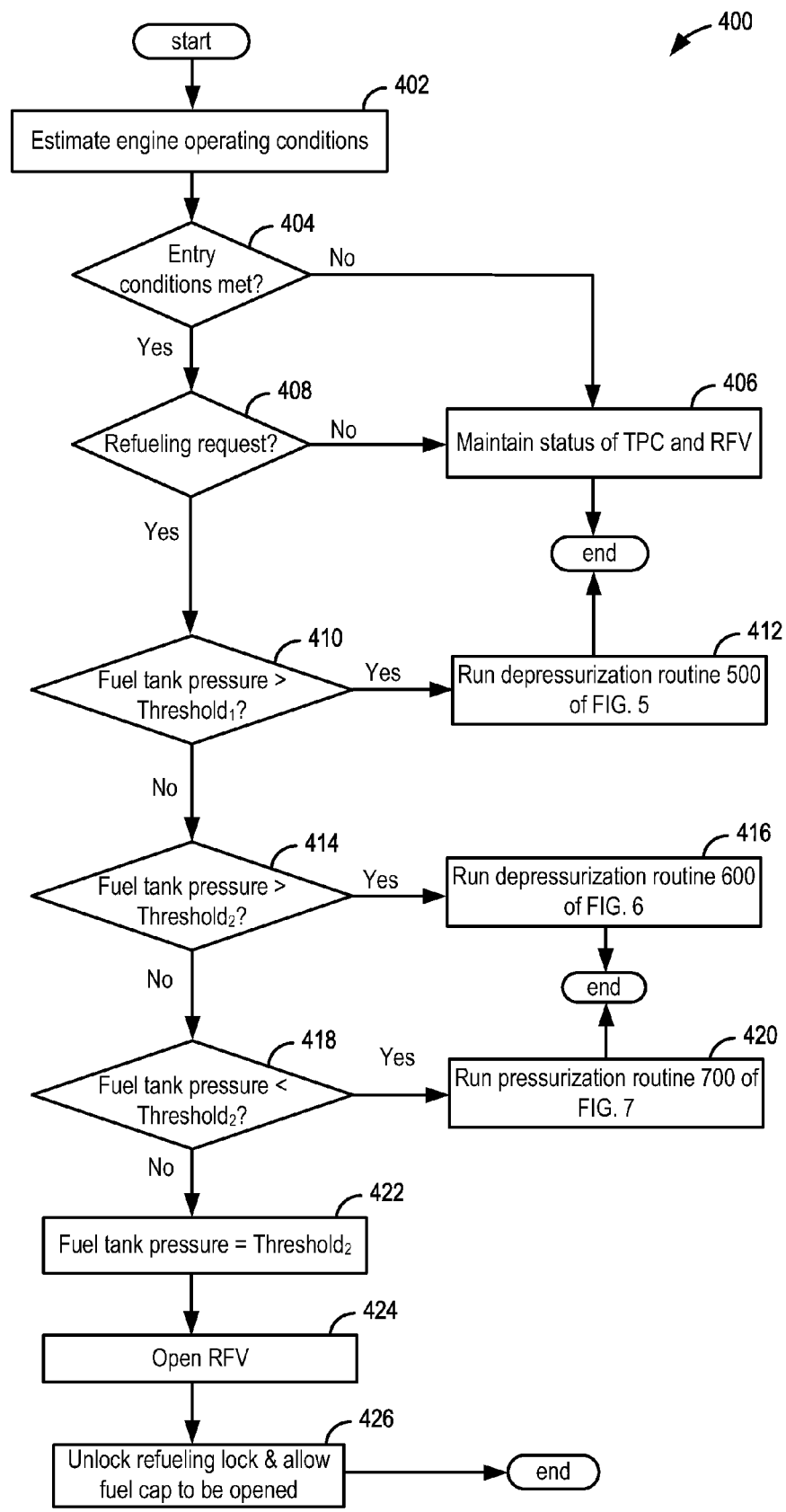
FIG. 4 is an example method for depressurizing a fuel tank in response to a tank refueling request.

FIG. 4 depicts an example control routine 400 for refueling a vehicle system, such as the vehicle systems depicted in FIGS. 1 and 3. In particular, routine 400 may manage the depressurization of a fuel tank in response to a refueling request from a vehicle operator.

At 402, engine operating conditions may be estimated. Engine operating conditions may be measured, estimated or inferred, and may include various vehicle conditions, such as vehicle speed, as well as various engine operating conditions, such as engine operating mode, engine speed, engine temperature, exhaust temperature, torque demand, air-fuel ratio, etc.

At 404, it may be determined if entry conditions are met. Entry conditions may include engine off conditions when an engine of the vehicle is not in operation. For example, the vehicle may be a hybrid electric vehicle operating in an engine off mode and being powered by batteries in the vehicle. As another example, entry conditions may include a key-off event wherein the vehicle is turned off, e.g. where the vehicle is parked or is not in use and the engine is not running Entry conditions may be further based on temperatures in the fuel system or evaporative emission control system, e.g., entry conditions during engine-off conditions may be based on a temperature in the fuel system less than a threshold temperature or greater than a threshold temperature. For example, entry conditions may include determining if a temperature in the fuel system is in a predetermined range of temperatures. If entry conditions are not met, routine 400 may proceed to 406 where the status of the tank pressure control valve (TPC) and the refueling valve (RFV) may be maintained. Routine 400 may then end.

If entry conditions are met at 404, routine 400 proceeds to 408 where it may be determined if a refueling request has been received. For example, a refuel request may comprise the depression of a button, e.g., refueling button 197, by the vehicle operator on a vehicle instrument panel in the vehicle, e.g., instrument panel 196. Thus, the refuel request may include manually requesting opening of a fuel cap coupled to the fuel tank. For example, a vehicle operator may provide input to the vehicle system indicating a desire to refuel the vehicle. If a refuel request is not received at 408, routine 400 may proceed to 406 where the status of the TPC and RFV may be maintained. Routine 400 may then end.

If a refuel request is confirmed at 408, routine 400 may proceed to 410 where it may be determined if fuel tank pressure is greater than a first threshold, $Threshold_1$. Fuel tank pressure may be determined through a pressure sensor coupled to the fuel tank. If fuel tank pressure is greater than the first threshold, $Threshold_1$, routine 400 may proceed to 412 where a depressurization routine 500 may be activated. Routine 500 will be elaborated below in reference to FIG. 5.

If fuel tank pressure is not greater than the first threshold, $Threshold_1$, routine 400 may proceed to 414 where it may be determined if fuel tank pressure is greater than a second threshold, $Threshold_2$. If fuel tank pressure is greater than the second threshold, $Threshold_2$, routine 400 may proceed to 416 where a depressurization routine 600 may be initiated. Routine 600 is, therefore, performed when fuel tank pressure is lower than the first threshold and higher than the second threshold. Routine 600 will be elaborated below in reference to FIG. 6.

If fuel tank pressure is not greater than the second threshold, $Threshold_2$, routine 400 may proceed to 418 where it may be determined if fuel tank pressure is lower than the second threshold, $Threshold_2$. If fuel tank pressure is lower than the second threshold, $Threshold_2$, routine 400 may proceed to 420 where a depressurization routine 700 may be operated.

Thus, routine 700 may be run when fuel tank pressure is a negative pressure. Routine 700 will be elaborated below in reference to FIG. 7.

If fuel tank pressure is not lower than the second threshold, $Threshold_2$, at 422, it may be determined that fuel tank pressure is equal to the second threshold, $Threshold_2$, or atmospheric pressure. At 424, routine 400 may open the refueling valve to allow any fuel vapors to be transferred to the fuel vapor storage device, e.g. a canister, and at 426, the refueling lock may be unlocked to allow refueling. A fuel cap may be allowed to open to commence fueling.

Figure 5:
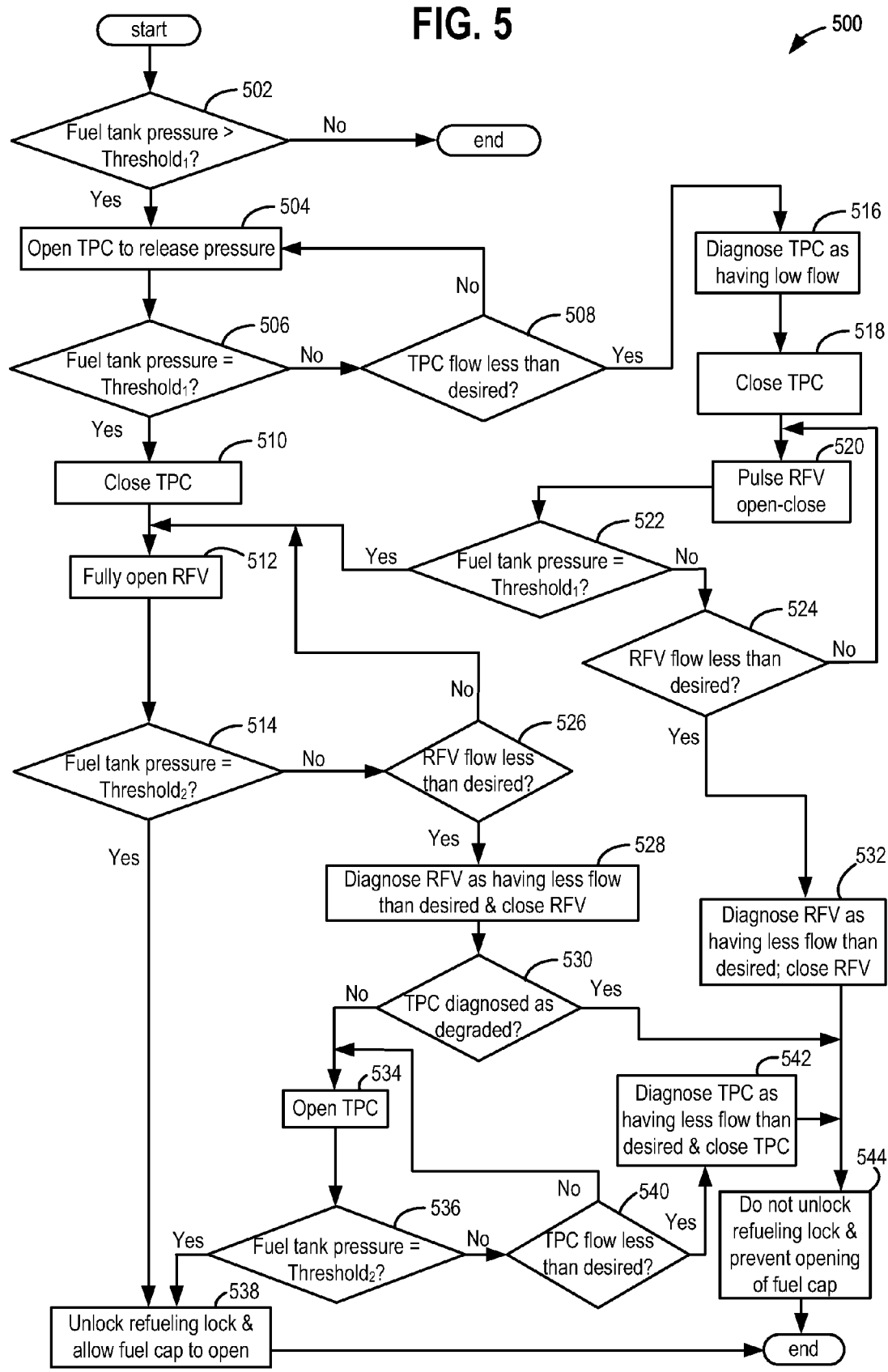
FIG. 5 shows an example flowchart illustrating a routine to depressurize a fuel tank when the pressure within the tank is higher than a first predetermined threshold.

Thus, based on the pressure within the fuel tank, a depressurization (from a positive or negative pressure) routine may be selected and activated. Turning now to FIG. 5, it depicts routine 500 for depressurizing a fuel tank when the pressure within is higher than a first threshold. Specifically, pressure may be released first via the TPC until it reaches the first predetermined pressure whereupon the TPC may be closed. Next, the RFV may be opened to further reduce fuel tank pressure to a second predetermined pressure, or atmospheric pressure. If it is determined that flow through the RFV is less than desired, then the TPC may be opened until the second predetermined pressure is reached.

At 502, it may be confirmed that fuel tank pressure is greater than a first threshold, $Threshold_1$. If it is determined that fuel tank pressure is not greater than the first threshold, routine 500 may end. However, if it is confirmed that fuel tank pressure is greater than a first threshold, $Threshold_1$, routine 500 may proceed to 504 where the TPC may be opened to release pressure. Since the TPC has a smaller orifice, pressure within the fuel tank may be released gradually. At 506, it may be determined if fuel tank pressure has reached the first threshold, $Threshold_1$. If fuel tank pressure has not reduced to $Threshold_1$, routine 500 may proceed to 508 where it may be confirmed if flow through the TPC is less than desired. For example, flow through the TPC may be less than desired when a rate of change in pressure is below a threshold. In another example, if pressure within the fuel tank does not reach the first threshold within a preselected time, it may be determined that flow through the TPC is less than desired. In yet another example, if there is substantially no change in pressure within the fuel tank, it may be confirmed that flow through the TPC is less than desired.

If it is determined that flow through the TPC is not less than desired, routine 500 may return to 504 where the TPC may continue to be maintained in an open position. On the other hand, if it is determined at 506 that fuel tank pressure has decreased to the first predetermined pressure, $Threshold_1$, routine 500 proceeds to 510 where the TPC may be closed. At 512, the RFV may be opened fully to release pressure to a second threshold, $Threshold_2$.

Next, at 514, it may be determined if the fuel tank pressure is equal to the second threshold, $Threshold_2$. The second threshold herein may represent a lesser fuel tank pressure than the first threshold, as explained in reference to FIG. 2. If it is determined that the pressure within the fuel tank has reached the second threshold, at 538, the refueling lock may be unlocked allowing fueling to commence via opening of a fuel cap.

Returning now to 508, if it is confirmed that flow through the TPC is less than desired, routine 500 may proceed to 516 where it may diagnose the TPC as having less than desired flow. Further, the TPC may be closed at 518. Next, at 520, the RFV may be opened to release pressure. Herein, the RFV may be repeatedly opened and closed to prevent a rapid decrease in fuel tank pressure. Further, the RFV may be a solenoid actuated valve so that the repeated opening and closing of the RFV may comprise pulse width modulating the solenoid of the RFV. At 522, routine 500 may assess if fuel tank pressure has reached the first threshold, Threshold$_1$. If pressure within the fuel tank is equal to Threshold$_1$, routine 500 may continue to 512 where the RFV may be fully opened to further release pressure to the second threshold.

If, at 522, it is confirmed that fuel tank pressure continues to be higher than the first threshold, at 524, routine 500 may check if flow through the RFV is less than a desired flow. If a rate of change in fuel tank pressure is lower than a threshold, flow through the RFV may be diagnosed as being less than desired. In another example, if pressure within the fuel tank does not reduce within a preselected time, it may be confirmed that flow through the RFV is less than desired. In yet another example, if pressure within the tank does not substantially change, it may be confirmed that flow through the RFV is less than desired.

It will be appreciated that the threshold for rate of change in pressure mentioned above is distinct from the threshold for rate of change in pressure described in reference to 508. Similarly, the preselected time mentioned above may be different from the preselected time in reference to 508.

Thus, if it is confirmed at 524 that the flow through the RFV is less than desired, routine 500 may proceed to 532 where it may diagnose the RFV as having lowered flow and the RFV may be closed. Further, at 544, the refueling lock may be retained in its locked position and a fuel cap connected to the fuel tank may be prevented from being opened.

If, on the other hand, it is determined at 524, that flow through the RFV is not less than desired, the RFV may continue to be opened and closed repeatedly until the fuel tank pressure reduces to Threshold$_1$. As explained earlier in reference to 522, once the pressure within the fuel tank is equal to Threshold$_1$, the RFV may be fully opened at 512 to further release pressure until a second threshold is reached.

Returning now to 514, if it is determined that fuel tank pressure has not reduced to the second threshold, Threshold$_2$, at 526, it may be confirmed if the RFV has lower flow than desired. If pressure within the fuel tank does not reach the second threshold within a preselected time, it may be assessed that the RFV has a lower than desired flow rate. If the rate of change in pressure is below a threshold, the RFV may be diagnosed as having a reduced flow rate. In another example, if there is substantially no change in pressure after the RFV is opened, it may be determined that flow through the RFV is limited.

It will be appreciated that the threshold for rate of change in pressure mentioned above is distinct from the threshold for rate of change in pressure described in reference to 508 and 522. Similarly, the preselected time mentioned above may be different from the preselected time in reference to 508 and 522.

If it is determined, at 526, that flow through the RFV is not less than desired, routine 500 proceeds to 512 where it continues to maintain the RFV at a fully open position until fuel tank pressure reduces to the second threshold. On the other hand, if it is confirmed that flow through the RFV is reduced, at 528, routine 500 may diagnose the RFV as having less flow than desired and may close the RFV. Next, at 530, it may be determined if the TPC has been previously diagnosed as having reduced flow. For example, the TPC may be diagnosed with less than desired flow at 516. If it is determined that the TPC has previously been diagnosed as having less than desired flow, routine 500 may proceed to 544 where the refueling lock is retained in a locked position and the fuel cap may be prevented from opening.

If, on the other hand, it is confirmed that the TPC has not been previously diagnosed with reduced flow, routine 500 proceeds to 534 where the TPC may be opened to release pressure. At 536, it may be determined if fuel tank pressure is equal to the second threshold, Threshold$_2$. If fuel tank pressure has reached the second threshold, routine 500 may continue to 538 where the refueling lock may be unlocked and the fuel cap connected to the fuel tank may be allowed to open to begin fueling.

However, if the fuel tank pressure is determined to be higher than the second threshold, routine 500 may proceed to 540 where it may be confirmed if the flow through the TPC is less than desired. Flow through the TPC may be determined to be less than desired if the rate of change in pressure is less than a threshold. In another example, if the fuel tank pressure does not reach the second threshold within a preselected time, the TPC may be diagnosed as having less than desired flow. In yet another example, if there is practically no change in fuel tank pressure after the TPC is opened, the TPC may be diagnosed as having a lower flow rate than desired.

It will be appreciated that the threshold for rate of change in pressure mentioned above is distinct from the threshold for rate of change in pressure described in reference to 508, 526 and 522. Similarly, the preselected time mentioned above may be different from the preselected time in reference to 508, 526 and 522.

If, at 540, it is determined that the flow through the TPC is not less than desired, routine 500 may proceed to 534 where it may continue to maintain the TOC at an open position to allow further reduction in fuel tank pressure. If it is confirmed that flow through the TPC is less than desired, at 542, routine 500 may diagnose a less than desired flow through TPC and may close the TPC. Further, the refueling lock may be maintained in a locked position at 544.

In this way, before refueling a fuel tank having a pressure above a first predetermined pressure, pressure may be released through a first valve to the first predetermined pressure and then the first valve may be closed. A second valve may then be opened to further reduce fuel tank pressure to a second predetermined pressure. If flow through the second valve is less than desired, then the first valve may be opened until the second predetermined pressure is reached.

In another example, before refueling a fuel tank having a pressure above a first predetermined pressure, and when flow through a first and a second valve coupled to the fuel tank is at least at a desired flow, pressure may be released through the first valve to the first predetermined pressure and then the first valve may be closed. The second valve may then be opened to further reduce fuel tank pressure to a second predetermined pressure. If flow through the first valve is determined to be less than desired, then the second valve may be opened until the first predetermined pressure is reached. Herein, the method may comprise repeatedly opening and closing the second valve to prevent too rapid a decrease in the pressure.

The above methods may further include preventing opening a fuel cap connected to the fuel tank until a second predetermined pressure is reached.

It will be appreciated that when routine 500 confirms if flow through either the TPC or the RFV is less than desired, the thresholds for rate of change in pressure may be different for each valve. The TPC may have a smaller orifice and a smaller aperture compared to the RFV. Therefore, the rate of change in pressure may be slower if the TPC is opened. On the other hand, fuel tank pressure may be released at a faster flow rate if the RFV is opened.

Figure 6:
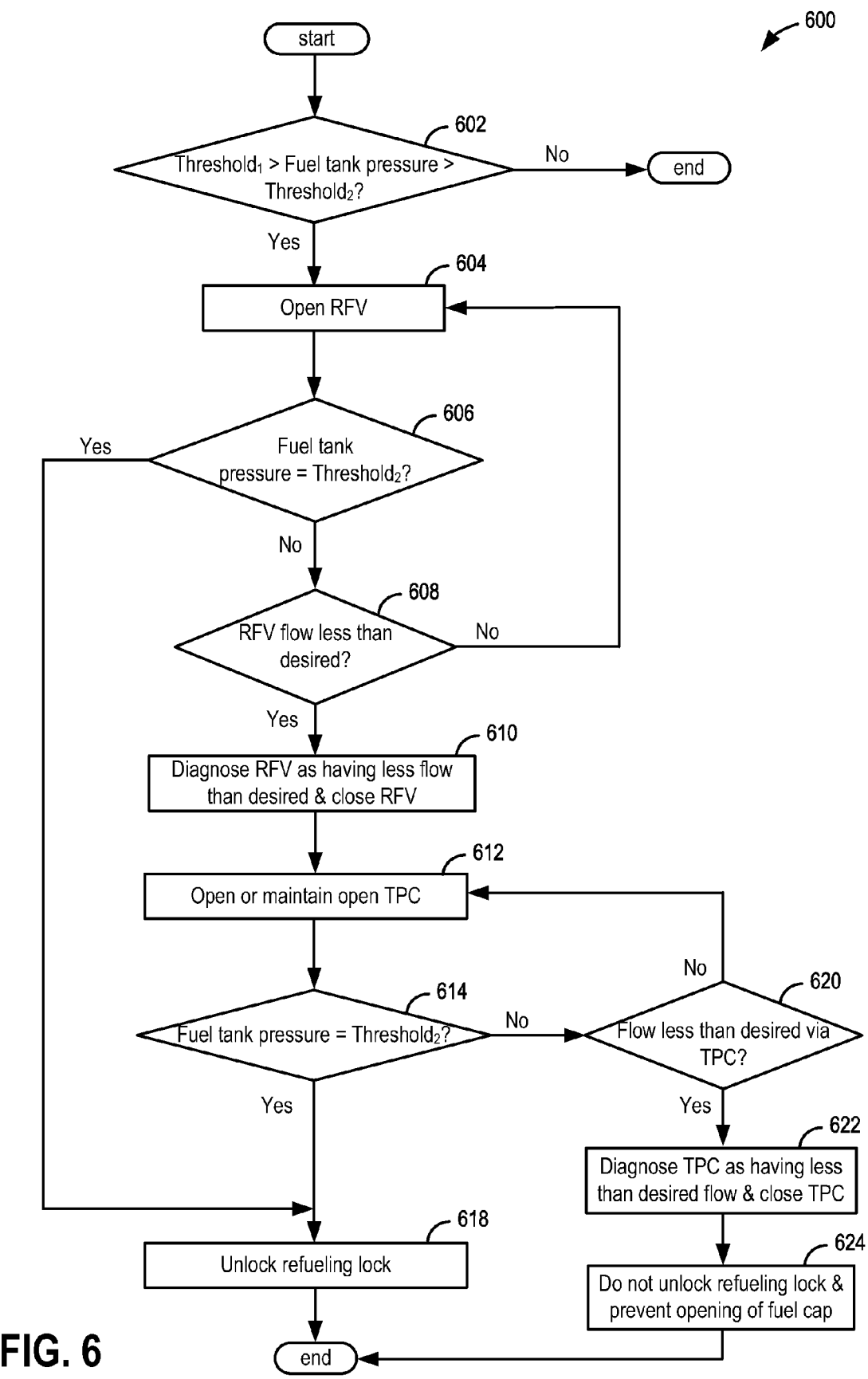
FIG. 6 is an example flowchart depicting a routine to depressurize a fuel tank when the pressure within the tank is higher than atmospheric pressure but lower than a first predetermined threshold.

Turning now to FIG. 6, it depicts routine 600 for depressurizing a fuel tank when the fuel tank pressure is greater than a second threshold but lower than a first threshold. Herein, the first threshold may also be termed as first predetermined pressure, and the second threshold may also be referred to as second predetermined pressure. Specifically, the RFV is opened to reduce fuel tank pressure to a second predetermined pressure, e.g. atmospheric pressure. If the RFV is determined to have less than desired flow, the TPC may be opened to release the pressure within the fuel tank.

At 602, it may be determined if fuel tank pressure is lower than a first threshold, $Threshold_1$, and greater than the second threshold, $Threshold_2$. If fuel tank pressure is determined to be either lower than $Threshold_2$ or greater than $Threshold_1$, routine 600 ends.

If pressure within the fuel tank is confirmed to be greater than $Threshold_2$ and below $Threshold_1$, routine 600 proceeds to 604 where the RFV may be opened to release pressure. At 606, it may be confirmed if fuel tank pressure has reduced to the second threshold, $Threshold_2$. If pressure within the fuel tank is equal to $Threshold_2$, routine 600 may continue to 618 where the refueling lock may be unlocked and a fuel cap may be allowed to open to begin fueling.

On the other hand, if it is determined at 606 that fuel tank pressure has not reduced to the second threshold, $Threshold_2$, then at 608, it may be confirmed that the RFV has a flow that is less than desired. For example, if pressure within the fuel tank does not reduce to the second threshold within a preselected time, it may be determined that the RFV has a lower than desired flow rate. In another example, if the rate of change in pressure is lower than a threshold, the RFV may be diagnosed as having a reduced flow rate. In yet another example, if there is substantially no change in pressure after the RFV is opened, it may be determined that flow through the RFV is limited.

If it is determined, at 608, that flow through the RFV is not less than desired, routine 600 may return to 604 and may continue to maintain the RFV at an open position until fuel tank pressure reduces to the second threshold. On the other hand, if it is confirmed that flow through the RFV is reduced, routine 600 may proceed to 610 and diagnose the RFV as having less flow than desired, and may close the RFV.

At 612, the TPC valve may be opened to release fuel tank pressure until the second threshold is reached. At 614, routine 600 may confirm if fuel tank pressure has reduced to the second threshold. If it is confirmed that the fuel tank pressure is equal to the second threshold, the refueling lock may be unlocked at 618, and a fuel cap may be opened to commence fueling.

If, on the other hand, at 614, it is confirmed that fuel tank pressure is not equal to the second threshold, routine 600 proceeds to 620. At 620, it may be determined if flow through the TPC is less than desired. Flow through the TPC may be determined to be less than desired if the rate of change in pressure is below a threshold. In another example, when pressure does not reach the second threshold, $Threshold_2$, within a preselected time, flow through the TPC may be determined as restricted. In yet another example, if there is substantially no change in pressure within the fuel tank, it may be confirmed that flow through the TPC is lower than desired.

If, at 620, flow through TPC is not determined to be less than desired flow, routine 600 may return to 612 where the TPC is maintained open. Conversely, if flow through the TPC is confirmed to be less than desired, routine 600 may diagnose the TPC as having less than desired flow at 622, and may close the TPC. Further, at 624, routine 600 may not unlock the refueling lock and the fuel cap may be prevented from opening for fueling.

It will be appreciated that when routine 600 confirms if flow through either the TPC or the RFV is less than desired, the thresholds for rate of change in pressure may be different for each valve. Further, the preselected times for each of the TPC and RFV may be distinct.

In this way, a method for a fuel tank comprises: before refueling a fuel tank having a pressure below a first predetermined pressure (or a first threshold), releasing the pressure through a second valve to a second predetermined pressure (or a second threshold), and if the second valve is restricted and the pressure does not reach the second predetermined pressure within an expected time, then opening a first valve until the second predetermined pressure is reached, the first valve normally being used when the pressure is above the first predetermined pressure to reduce the pressure to the first predetermined pressure. The method may further comprise releasing the pressure through the first valve to the second predetermined pressure when the second valve is restricted, and may also comprise preventing the opening of a fuel cap connected to the fuel tank until the second predetermined pressure is reached. Pressure released through the second valve may be released at a faster flow rate than through the first valve.

Figure 7:
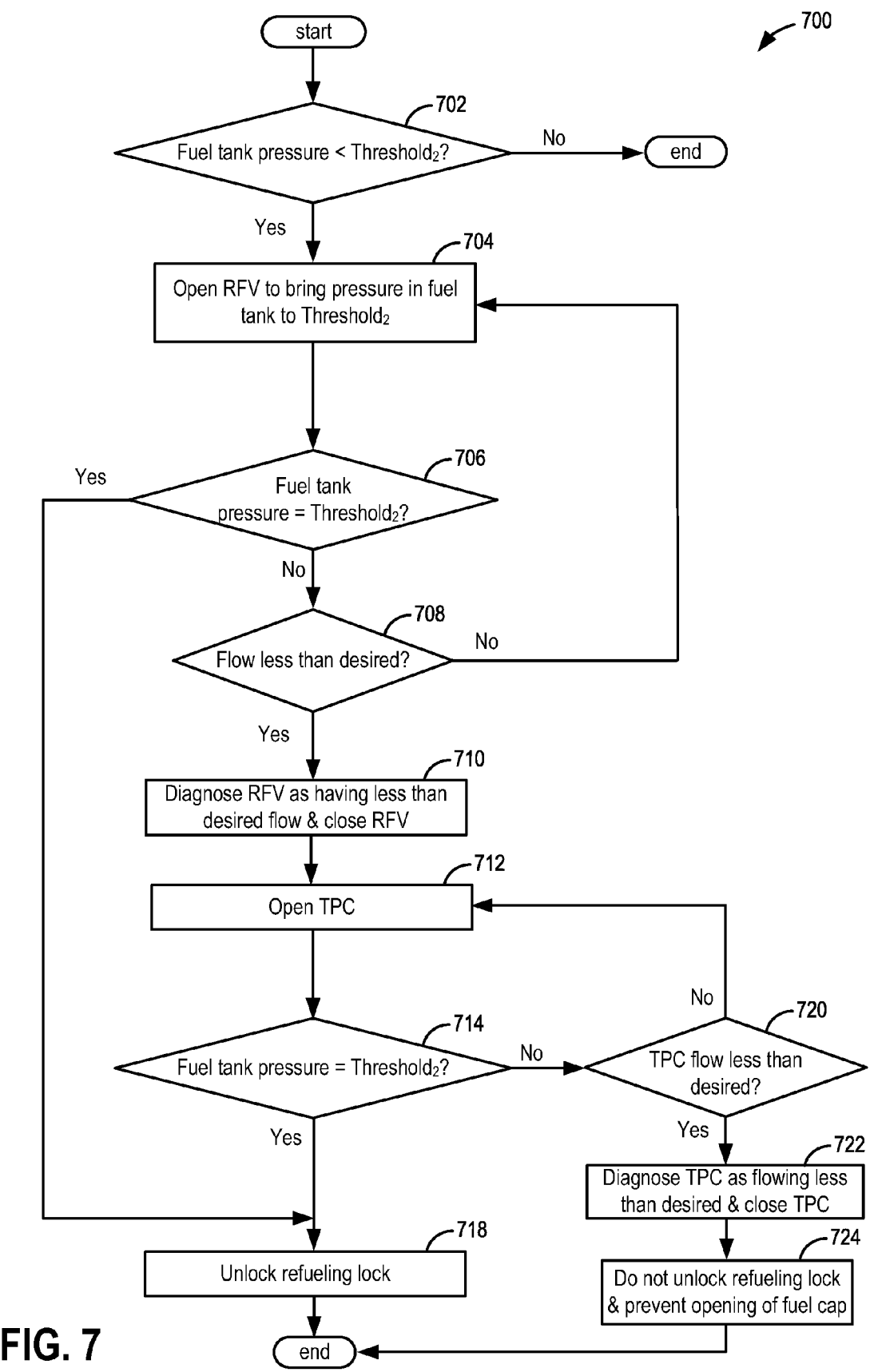
FIG. 7 is an example flowchart for a routine to bring a fuel tank pressure to or toward atmospheric pressure when the pressure within the tank is lower than atmospheric pressure, e.g., at negative pressure or vacuum.

Continuing to FIG. 7, it shows routine 700 for bringing a fuel tank pressure to or toward a second predetermined pressure, prior to a refueling event, when fuel tank pressure is below a second predetermined pressure (also termed second threshold). The second predetermined pressure may substantially comprise atmospheric pressure and therefore, the fuel tank pressure may be negative pressure or vacuum. Specifically, routine 700 determines if the fuel tank pressure is below atmospheric pressure and opens the RFV to bring pressure within the fuel tank to atmospheric pressure before refueling. Further, if the RFV is diagnosed as having less than desired flow, the TPC may be opened to allow the fuel tank pressure to reach atmospheric pressure.

At 702, routine 700 may confirm that fuel tank pressure is lower than a second threshold, $Threshold_2$. If it is determined that fuel tank pressure is not below the second threshold, routine 700 may end. On the other hand, if it is confirmed that fuel tank pressure is below the second threshold, routine 700 may proceed to 704 where the RFV may be opened to depressurize the fuel tank. For example, air may be drawn through the fuel vapor storage device into the fuel tank to bring tank pressure toward the second threshold. At 706, it may be assessed if fuel tank pressure is equal to the second threshold, $Threshold_2$. If it is determined that the fuel tank pressure is equal to the second threshold, routine 700 may proceed to 718 where the refueling lock may be unlocked and a fuel cap may be allowed to open to commence fueling.

If, at 706, it is determined that fuel tank pressure is not equal to the second threshold, routine 700 may proceed to 708 where it may confirm if flow through the RFV is lower than desired. In one example, flow through the RFV may be determined to be lower than a desired flow if the fuel tank pressure does not reach the second threshold within an expected time. In another example, RFV may be diagnosed as having less than desired flow if the rate of change in pressure is below a threshold. In yet another example, if there is substantially no change in fuel tank pressure, the RFV may be assessed as having less than desired flow.

If the RFV is determined to not have less than desired flow, routine 700 may continue to 704 where the RFV is maintained open. However, if flow through the RFV is determined to be less than desired, routine 700 may diagnose the RFV as having less flow than desired and may close the RFV at 710. At 712, the TPC may be opened to allow fuel tank pressure to reach the second threshold. For example, air may be drawn into the fuel tank through the TPC via the fuel vapor storage device to bring tank pressure toward the second threshold.

At 714, routine 700 may confirm that fuel tank pressure has reached the second threshold after the TPC has been opened. If it is determined that fuel tank pressure is equal to the second threshold, Threshold$_2$, at 718, the refueling lock may be unlocked and additionally, a fuel cap may be allowed to open.

If, at 714, fuel tank pressure is determined to not be equal to the second threshold, routine 700 may proceed to 720 where it may confirm if flow through the TPC is less than desired. In one example, if no substantial change is measured in fuel tank pressure after the TPC is opened, flow through the TPC may be less than desired. In another example, if the fuel tank pressure does not reach the second threshold within a preselected time, it may be determined that TPC flow is lower than desired. In yet another example, if the rate of change in pressure is below a threshold, TPC may be determined to have restricted flow.

If it is determined, at 720, that flow through the TPC is not less than desired, routine 700 proceeds to 712 where the TPC valve may be maintained open until fuel tank pressure reaches the second threshold. On the other hand, if it is confirmed that flow through the TPC is lower than desired, routine 700 may continue to 722 where TPC may be diagnosed as having a lower flow rate than desired and the TPC may be closed. Further, at 724, the refueling lock may remain locked and a fuel cap connected to the fuel tank may be prevented from being opened since pressure within the fuel tank is not at the second predetermined pressure (herein, second threshold).

In this way, when pressure within a fuel tank is initially lower than a second predetermined pressure (or second threshold), a method comprises releasing the fuel tank pressure through a second valve (or RFV) to the second predetermined pressure. The method may further comprise releasing the fuel tank pressure through a first valve (or TPC) to the second predetermined pressure when the second valve is restricted. Additionally, the opening of a fuel cap connected to the fuel tank may be prevented until the second predetermined pressure is reached.

It will be appreciated that the threshold for rate of change in pressure mentioned in routine 700, when confirming if the TPC and/or the RFV have low flow rates, is distinct from the threshold for rate of change in pressure described in reference to FIGS. 5 and 6. Similarly, the preselected times mentioned in routine 700 may be different from the preselected times used in routines 500 and 600. Further, within routine 700, the TPC and the RFV may have distinct thresholds and preselected times when being diagnosed for low flow.

It will be further appreciated that a diagnostic code may be set by the controller if one or both of the TPC and RFV are diagnosed as having less flow than desired.

Turning now to FIG. 8, it shows map 800 which depicts an example venting of a fuel tank upon a refueling request when fuel tank pressure is above a first predetermined pressure. Map 800 portrays a situation when both valves have desired flow rates, another when the refueling valve has a lower than desired flow rate, and a third situation when the tank pressure control valve has less than desired flow. Map 800 includes plot 802 indicating the status of a tank refueling request over time, plot 804 indicating the status of a tank pressure control (TPC) valve over time, plot 806 indicating the status of a refueling valve (RFV) over time, plot 808 indicating changes in pressure within a fuel tank over time, and plot 810 indicating the status of a refueling lock over time. Time may be plotted along the x-axis in map 800. Line 840 represents a first predetermined pressure or first threshold for fuel tank pressure. Line 845 represents a second predetermined pressure or second threshold for fuel tank pressure. The second predetermined pressure may be equal to atmospheric pressure.

At time $t_0$, no tank refuel request in indicated, as shown by plot 802. As such, the status of the TPC and the status of the RFV are maintained. As shown by plots 804 and 806, the valves are closed at time $t_0$ and thus, are maintained closed, assuming the tank pressure is not being relieved by the TPC during other operating conditions. Additionally, the refueling lock is in locked position and is maintained locked, as shown by plot 810. Further, pressure within the fuel tank, as shown by plot 808, is above the first threshold, line 840, at time $t_0$.

At time $t_1$, a refueling request is received, and since the fuel tank pressure is greater than first threshold 840, the TPC is opened at $t_1$ while the RFV is maintained closed. From time $t_1$ to time $t_2$, the TPC is open, allowing for fuel vapors to vent from the fuel tank to the evaporative emissions system. As such, the fuel tank pressure decreases, as indicated by plot 808. At time $t_2$, fuel tank pressure drops to first threshold 840. Therefore, the TPC is closed at $t_2$ and the RFV is opened concurrently. Since the RFV releases pressure at a faster flow rate than the TPC, pressure within the fuel tank, plot 808, drops rapidly between $t_2$ and $t_3$. At time $t_3$, fuel tank pressure drops below second threshold 845. In response to fuel tank pressure dropping below second threshold 845, the refueling lock is unlocked, and a fuel cap may be allowed to open for refueling.

Between time $t_3$ and $t_4$, multiple refueling events may occur. As such, a duration of time may pass between $t_3$ and $t_4$. At time $t_4$, a new refueling request is received, and the TPC is opened to enable a decrease in fuel tank pressure which at $t_4$ is greater than the first threshold 840. Between time $t_4$ and time $t_5$, therefore, fuel tank pressure reduces and at $t_5$, fuel tank pressure drops to the first threshold 840. Therefore, the TPC is closed at $t_5$ and simultaneously, the RFV may be commanded open. However, flow through the RFV may be less than desired if the RFV does not fully open when commanded. In the example shown, the rate of change in fuel tank pressure may be slower because the RFV does not open to its fullest extent (as shown at 807). Further, the pressure does not decrease to the second threshold 845 by the time $t_6$ is reached (as shown at 809). The RFV may now be diagnosed as having less flow than desired and may be commanded fully closed at $t_6$. Further, a diagnostic code may be set by the controller to indicate less than desired flow through the RFV.

Since fuel tank pressure remains greater than the second threshold at $t_6$, the TPC is opened to enable a release of pressure. The TPC opens to its fullest extent and fuel tank pressure decreases such that at time $t_7$, tank pressure falls to the second threshold 845 whereupon the refueling lock is unlocked and fueling may commence. In this way, when flow through the RFV is determined to be lower than desired, the TPC valve may be opened to reduce fuel tank pressure in preparation for refueling.

Between $t_7$ and $t_8$, the diagnostic code set by the controller for low flow through the RFV may be examined and flow through the RFV may be corrected. Further, a duration of time may pass between $t_7$ and $t_8$ wherein multiple refueling events may occur similar to that described between $t_0$ and $t_3$.

At $t_8$, a new refueling request is received. Since fuel tank pressure is higher than the first threshold, the TPC may be commanded open. However, if the TPC does not fully open when commanded open, an insufficient change in fuel tank pressure may result. In the example shown at 805, the TPC opens slightly, and not to its fullest extent between $t_8$ and $t_9$, resulting in a significantly small drop in pressure (shown at 811). Therefore, the controller may diagnose the TPC as having less flow than desired, a diagnostic code may be set in its memory and the TPC may be closed at $t_9$. Further, at $t_9$, the RFV may be opened to allow a decrease in fuel tank pressure. Between time $t_9$ and time $t_{10}$, the RFV is repeatedly opened and closed. Since the RFV releases pressure at a faster rate than the TPC, it is pulsed to allow a slower release of pressure. Consequently, fuel tank pressure drops gradually between $t_9$ and $t_{10}$ until it reaches the first threshold 840 at $t_{10}$. Thereafter, the RFV is commanded to a fully open position and fuel tank pressure drops rapidly between $t_{10}$ and $t_{11}$, reaching the second threshold at $t_{11}$. At $t_{11}$, the refueling lock is opened allowing refueling to commence.

In this way, a refueling event may be initiated when fuel tank pressure is greater than a first predetermined pressure and if either of the two valves is restricted.

Turning now to FIG. 9, it shows map 900 which depicts an example venting of the fuel tank prior to a refueling event when the initial pressure within the tank is lower than a first predetermined pressure (or a first threshold) but higher than a second predetermined pressure (or a second threshold). Map 900 includes plot 902 indicating the status of a tank refueling request over time, plot 904 indicating the status of a tank pressure control (TPC) valve over time, plot 906 indicating the status of a refueling valve (RFV) over time, plot 908 indicating changes in pressure within a fuel tank over time, and plot 910 indicating the status of a refueling lock over time. Time is plotted along the x-axis in map 900. Line 840 represents a first predetermined pressure or first threshold for fuel tank pressure. Line 845 represents a second predetermined pressure or second threshold for fuel tank pressure. The second predetermined pressure may be equal to atmospheric pressure. As will be noted, the first predetermined pressure and the second predetermined pressure in map 900 may be the same as in Map 800 of FIG. 8.

At time $t_0$, no tank refuel request in indicated, as shown by plot 902. As such, the status of the TPC and the status of the RFV are maintained. As shown by plots 904 and 906, the valves are closed at time $t_0$ and thus, are maintained closed, assuming the tank pressure is not being relieved by TPC during other operating conditions. Additionally, the refueling lock is in locked position and is maintained locked, as shown by plot 910. Further, pressure within the fuel tank, as shown by plot 908, is below the first threshold, line 840, but above the second threshold, line 845, at time $t_0$.

At time $t_1$, a refueling request is received, and since the fuel tank pressure is lower than the first threshold 840, the RFV is opened at $t_1$ while the TPC is maintained closed. From time $t_1$ to time $t_2$, the RFV is open, allowing for fuel vapors to vent from the fuel tank to the evaporative emissions system. As such, the fuel tank pressure decreases, as indicated by plot 908. At time $t_2$, fuel tank pressure drops to second threshold 845. In response to fuel tank pressure dropping to second threshold 845, the refueling lock is unlocked at $t_2$, and a fuel cap may be allowed to open for refueling.

Between time $t_2$ and $t_3$, multiple refueling events may occur. As such, a duration of time may pass between $t_2$ and $t_3$. At time $t_3$, a new refueling request is received, and because fuel tank pressure is lower than the first threshold 840 but higher than the second threshold 845, the RFV is commanded open to enable a decrease in fuel tank pressure. However, the RFV does not open to its fullest extent (as shown at 907) and consequently, the rate of change in fuel tank pressure may be slower than a threshold (as shown at 909). The RFV may now be diagnosed as having less flow than desired and may be commanded fully closed. Further, a diagnostic code may be set by the vehicle controller.

Since fuel tank pressure remains greater than the second threshold 845 at $t_4$, the TPC is opened to enable a release of pressure. The TPC opens to its fullest extent and therefore, fuel tank pressure decreases gradually between time $t_4$ and time $t_5$. At $t_5$, tank pressure falls to the second threshold 845 whereupon the refueling lock is unlocked and fueling may commence. In this way, when flow through the RFV is determined to be lower than desired, the TPC valve may be opened to reduce fuel tank pressure in preparation for refueling.

Between $t_5$ and $t_6$, the diagnostic code set by the controller for low flow through the RFV may be examined and flow through the RFV may be corrected. In addition, a duration of time may pass between $t_5$ and $t_6$ wherein multiple refueling events may occur similar to that described between $t_0$ and $t_2$. At $t_6$, a new refueling request is received upon which the RFV may be commanded open. However, the RFV does not open to its fullest extent (as shown at 911) and may therefore have less flow than desired. Accordingly, pressure drop within the fuel tank is nominal (as shown at 913) between time $t_6$ and time $t_7$. In response to the minimal change in fuel tank pressure, the controller may diagnose the RFV as having less flow than desired and may set a diagnostic code in its memory. Further, the RFV may be closed at $t_7$.

Since fuel tank pressure remains higher than the second threshold, the TPC may be commanded open at $t_7$. However, the TPC does not open to its fullest extent (as shown at 905) resulting in less than desired flow. Thus, there is substantially no change in fuel tank pressure (as shown at 915) between time $t_7$ and time $t_8$, and the TPC may be closed at $t_8$. In response to fuel tank pressure being greater than the second threshold 845 at $t_8$, the refueling lock is retained in its locked position. Further, a fuel cap coupled to the fuel tank may be prevented from being opened. In this example, the refueling request may remain unsatisfied and the controller may set diagnostic codes for both the TPC and the RFV.

Continuing to FIG. 10, an example of fuel tank depressurization is depicted in map 1000 when pressure within the fuel tank is below a second predetermined pressure (or a second threshold). Herein, the RFV may be opened to bring pressure within the tank to the second predetermined pressure. The second predetermined pressure may be equal to atmospheric pressure and therefore, the tank may be at a negative pressure prior to a refueling event. Map 1000 includes plot 1002 indicating the status of a tank refueling request over time, plot 1004 indicating the status of a tank pressure control (TPC) valve over time, plot 1006 indicating the status of a refueling valve (RFV) over time, plot 1008 indicating changes in pressure within a fuel tank over time, and plot 1010 indicating the status of a refueling lock over time. Time is plotted along the x-axis in map 1000. Line 840 represents a first predetermined pressure or first threshold for fuel tank pressure. Line 845 represents a second predetermined pressure or second threshold for fuel tank pressure. The second predetermined pressure may be equal to atmospheric pressure. As will be noted, the first predetermined pressure and the second predetermined pressure in map 1000 may be the same as in map 800 of FIG. 8 and map 900 of FIG. 9.

At time $t_0$, no tank refuel request in indicated, as shown by plot 1002. As such, the status of the TPC and the status of the RFV are maintained. As shown by plots 1004 and 1006, the valves are closed at time $t_0$ and thus, are maintained closed, assuming the tank pressure is not being relieved by the TPC during other operating conditions. Additionally, the refueling lock is in locked position and is maintained locked, as shown by plot 1010. Further, pressure within the fuel tank, as shown by plot 1008, is below the second threshold, line 845, at time $t_0$.

At time $t_1$, a refueling request is received, and since the fuel tank pressure is lower than the second threshold 845, the RFV is opened at $t_1$ while the TPC is maintained closed. From time $t_1$ to time $t_2$, the RFV is open, allowing for a change in fuel tank pressure, as indicated by plot 1008. At time $t_2$, fuel tank pressure reaches the second threshold 845. In response to fuel tank pressure reaching the second threshold 845, the refueling lock is unlocked at $t_2$, and a fuel cap may be allowed to open for refueling.

Between time $t_2$ and $t_3$, multiple refueling events may occur. As such, a duration of time may pass between $t_2$ and $t_3$. At time $t_3$, a new refueling request is received, and the RFV is commanded open to bring fuel tank pressure to or toward the second threshold 845. However, flow through the RFV may be less than desired if the RFV does not fully open when commanded (as shown at 1007). The rate of change in fuel tank pressure may be slower (as shown at 1009) when the RFV does not open to its fullest extent. Further, the pressure may not reach the second threshold 845 within an expected time. The RFV may now be diagnosed as having less flow than desired and may be commanded fully closed at $t_4$. Further, a diagnostic code may be set by the controller.

Since fuel tank pressure remains below second threshold 845 at $t_4$, the TPC is opened. Therefore, fuel tank pressure reaches the second threshold at $t_5$ whereupon the refueling lock is unlocked and fueling may commence. In this way, when flow through the RFV is determined to be lower than desired and fuel tank pressure is a negative pressure, the TPC valve may be opened to bring fuel tank pressure to atmospheric pressure in preparation for refueling.

In this way, before refueling a fuel tank having a pressure higher than or lower than atmospheric pressure, the tank pressure control valve and the refueling valve may be used in conjunction to bring the pressure within the fuel tank to the atmospheric pressure. Further, if flow through one of the two valves is diagnosed as being less than desired, the other valve may be opened to enable a release of pressure within the fuel tank. Thus, a fuel tank may be depressurized in a timely manner prior to refueling.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

In one particular example, a two-valve non-integrated fueling canister only system may be provided.

It will be appreciated that the configurations and routines disclosed herein are exemplary in nature, and that these specific embodiments are not to be considered in a limiting sense, because numerous variations are possible. For example, the above technology can be applied to various HVAC system configurations. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
    before refueling a fuel tank having a pressure above a first predetermined pressure, releasing said pressure through a first valve to said predetermined pressure and then closing said first valve and opening a second valve to further reduce said pressure to a second predetermined pressure; and
    if flow through said second valve is less than desired, then opening said first valve until said second predetermined pressure is reached.

2. The method recited in claim 1, wherein a determination that said flow through said second valve is less than desired comprises one or more of the following: when a rate of change in said pressure is below a threshold; or when said pressure does not reach said second predetermined pressure within a preselected time; or there is substantially no change in said pressure.

3. The method recited in claim 1, further comprising preventing opening a fuel cap connected to said tank until said second predetermined pressure is reached.

4. The method recited in claim 1, wherein said pressure released through said second valve is released at a faster flow rate than through said first valve.

5. The method recited in claim 1, wherein said pressure released through said first valve and said second valve are released to said second predetermined pressure through at least one fuel vapor storage device.

6. The method recited in claim 1, further comprising supplying liquid fuel from said tank to an engine of a motor vehicle.

7. The method recited in claim 6, further comprising an electric motor for propelling said motor vehicle.

8. A method comprising:
    before refueling a fuel tank having a pressure above a first predetermined pressure, and when flow through a first and a second valve coupled to the fuel tank is at least at a desired flow,
    releasing said pressure through a first valve to said first predetermined pressure and then closing said first valve and opening a second valve to further reduce said pressure to a second predetermined pressure; and
    if flow through said first valve is less than desired, then opening said second valve until said first predetermined pressure is reached.

9. The method recited in claim 8, wherein said opening of said second valve comprises repeated opening and closing of said second valve until said first predetermined pressure is reached to prevent too rapid a decrease in said pressure and then, fully opening said second valve to the second predetermined pressure.

10. The method recited in claim 8, wherein said flow through said first valve being less than desired comprises one or more of the following: when a rate of change in said pressure is below a threshold; or when said pressure does not reach said predetermined pressure within a preselected time; or there is substantially no change in said pressure.

11. The method recited in claim 9, wherein said first and said second valves each comprise a solenoid actuated valve and said repeated opening and closing of said second valve comprises pulse width modulating said solenoid of said second valve.

12. The method recited in claim 8, wherein said pressure released through said first valve or said second valve are released to atmosphere through at least one fuel vapor storage device.

13. The method recited in claim 8, wherein said pressure released through said first valve or said second valve are released to an air intake of said engine through at least one fuel vapor storage device.

14. The method recited in claim 8, further comprising preventing opening a fuel cap connected to said tank until said second predetermined pressure is reached.

15. The method recited in claim 8, wherein said second predetermined pressure substantially comprises atmospheric pressure.

16. A method comprising:
before refueling a fuel tank having a pressure below a first predetermined pressure, releasing said pressure through a second valve to a second predetermined pressure; and
if said second valve is restricted and said pressure does not reach said second predetermined pressure within an expected time, then opening a first valve until said second predetermined pressure is reached, said first valve normally being used when said pressure is above said first predetermined pressure to reduce said pressure to said first predetermined pressure.

17. The method recited in claim 16, further comprising releasing said pressure through said second valve to said second predetermined pressure when said pressure is initially lower than said second predetermined pressure.

18. The method recited in claim 17, further comprising releasing said pressure through said first valve to said second predetermined pressure when said second valve is restricted.

19. The method recited in claim 16, further comprising preventing opening a fuel cap connected to said tank until said second predetermined pressure is reached.

20. The method recited in claim 16, wherein said pressure released through said second valve is released at a faster flow rate than through said first valve.

* * * * *